United States Patent [19]

Shaber

[11] 3,995,959

[45] Dec. 7, 1976

[54] METHOD AND APPARATUS FOR DETERMINING THE OPERATIONAL STATUS OF A PHOTOGRAPHIC FILM PROCESSOR

[76] Inventor: Gary S. Shaber, 326 Saybrook Road, Villanova, Pa. 19085

[22] Filed: Apr. 21, 1975

[21] Appl. No.: 570,217

[52] U.S. Cl. .............................. 356/202; 250/559; 250/578; 340/213 Q; 354/298

[51] Int. Cl.² .............................. G01N 21/06

[58] Field of Search .............. 354/297, 298, 299; 250/559, 560, 561, 571, 578; 356/202, 203, 205, 206, 209, 226; 340/213 Q

[56] References Cited

UNITED STATES PATENTS

| | | | |
|---|---|---|---|
| 1,895,760 | 1/1933 | Hunt | 354/298 |
| 3,388,652 | 6/1968 | Parrent | 354/298 |
| 3,528,749 | 9/1970 | Bowker | 356/202 |
| 3,554,109 | 1/1971 | Street et al. | 354/298 |
| 3,636,851 | 1/1972 | Furst | 356/202 X |
| 3,639,061 | 2/1972 | O'Brien et al. | 354/298 X |
| 3,690,765 | 9/1972 | Rickard et al. | 356/202 X |
| 3,696,728 | 10/1972 | Hope | 354/298 |
| 3,700,335 | 10/1972 | Seelbinder | 356/203 X |
| 3,709,613 | 1/1973 | Zahn et al. | 356/202 |
| 3,772,517 | 11/1973 | Smith | 356/226 X |
| 3,787,689 | 1/1974 | Fidelman | 354/298 X |
| 3,796,491 | 3/1974 | McIntosh et al. | 356/202 X |

OTHER PUBLICATIONS

LogEtronics Inc. "Use and Service Manual LOGEFLO LD–24 Graphic Arts Film Processor/Dryer", revised Aug. 1969, pp. 21–27.

*Primary Examiner*—Fred L. Braun
*Attorney, Agent, or Firm*—Miller & Prestia

[57] ABSTRACT

A method and apparatus for determining the operational status of a photographic film processor, particularly an X-ray film processor. A photographic film is exposed to a test pattern including at least three areas to produce, upon development of said test film, a light (medium density) area, a dark (high density) area and an unexposed (base fog) area. The test film is then developed, and densitometer readings made of the resultant film densities in the test areas. These densitometer readings are used as inputs to digital logic circuitry to produce a series of diagnostic indications of the processor's operational status.

10 Claims, 3 Drawing Figures

METHOD AND APPARATUS FOR DETERMINING THE OPERATIONAL STATUS OF A PHOTOGRAPHIC FILM PROCESSOR

BACKGROUND OF THE INVENTION

This invention relates to photographic film processors and more particularly to a method and apparatus for automatically determining the operational status of the processor. In developing photographic films, it is important to closely monitor a number of critical parameters, such as for example, the temperature and strength of the chemical developers employed, to insure that the proper film densities are achieved. It is sometimes possible to determine that one or more of these parameters is not correct by inspection of a normally developed film, but without more information, identification of the specific cause of imporper processing is difficult.

Manual comparison of a developed film (produced from calibrated exposure of sections of the film) to predetermined density standards and analysis of the results of this comparison (sometimes requiring trial and error adjustments of the processor) is presently relied upon to determine the operational status of X-ray film processors in some hospitals. The general object of the present invention is to provide a method and apparatus for performing this function automatically.

This invention allows an operator to isolate the specific cause of improper development of a test film strip, by automatically measuring the densities of the film at three specific test areas, and then using the results of these measurements to determine the operational status of the processor. The operator can then make any required adjustments to the processor and proceed to develop other films without resorting to the usual trail and error approach to identify which parameters should be changed. This saves time and material and since the necessary adjustments are automatically indicated, this invention reduces the skill levels required of the personnel operating the film processor.

SUMMARY OF THE INVENTION

A photographic film is exposed to a test pattern including at least three areas to produce, upon development of said test film, a light (medium density) area, a dark (high density) area and an unexposed (base fog) area. The test film is then processed and the developed film is inserted into the apparatus of this invention between a constant light source means (three light emitting diodes in the embodiment of the invention described and illustrated) and a photodetector means (three phototransistors in the illustrated embodiment). The density of this film in three test areas (high and medium density areas and the unexposed base fog area of the film) is sensed by the photodetector means which produces output signals indicative of high density (dark) area above or below a first preselected density limit, medium area above, within or above second and third preselected density limits, and base fog area above or below a fourth preselected density limit. These signals are then operated upon by digital logic to generate automatically status indications indicative of the operational status of the processor used to process the test film.

Accordingly, it is a primary object of this invention to provide a method of automatically detecting the operational status of a film processor.

It is another object of the invention to provide an apparatus capable of automatically inspecting a test film to produce output indications relative to the operational status of the film processor used to process the test film.

These and other objects and advantages will become more fully apparent to those skilled in the art from the following description, taken in conjunction with the accompanying drawings, in which like reference numerals designate like parts.

BRIEF DESCRIPTION OF THE INVENTION

FIG. 1 is a functional block diagram depicting an embodiment of the invention;

FIG. 2*a* is a schematic diagram of the densitometer and attendant light intensity control and timer circuitry of an apparatus embodying the invention; and FIG. 2*b* is a schematic diagram of the digital logic circuitry embodying the invention.

DESCRIPTION OF THE PREFERRED EMBODIMENT

Figure 1:
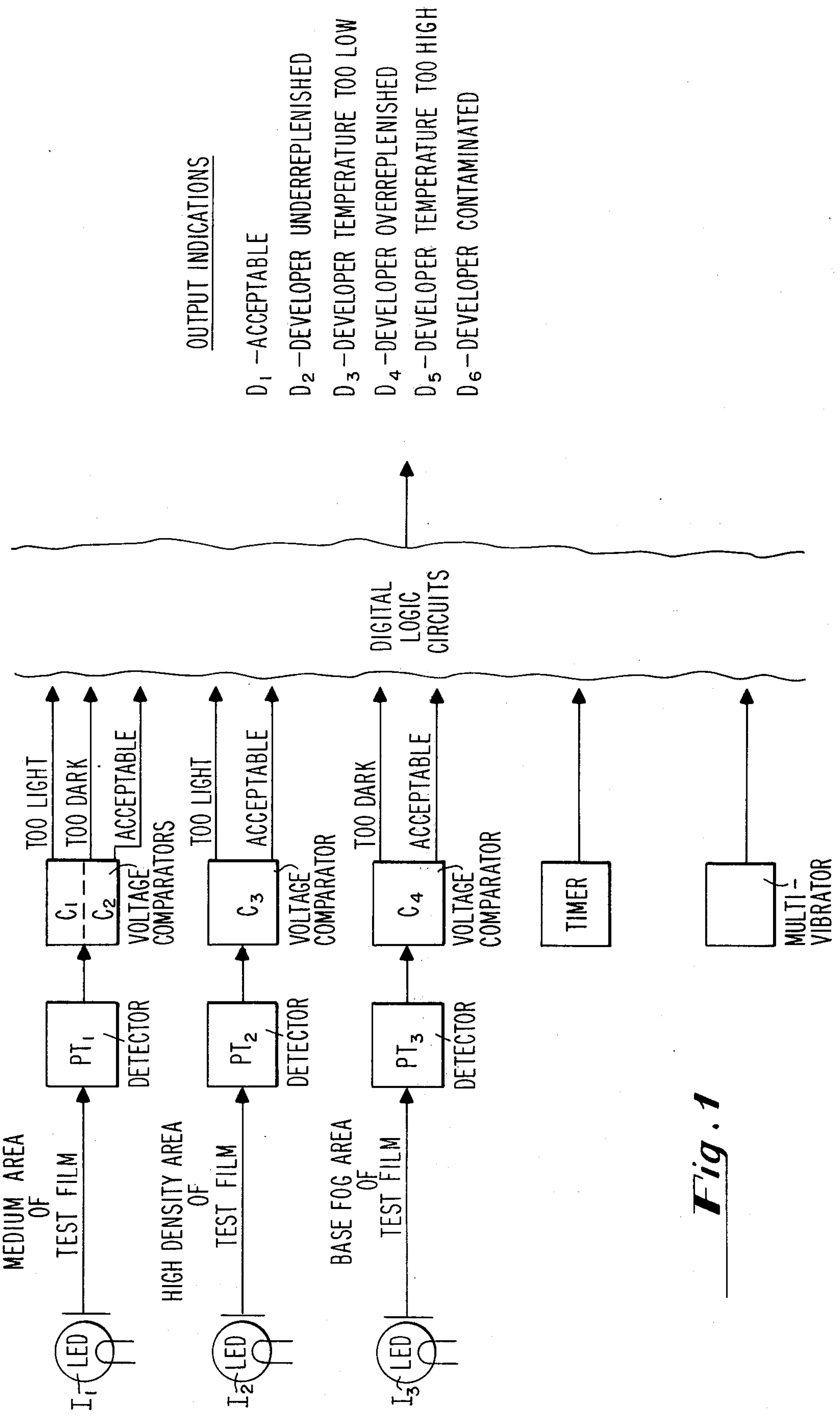

FIG. 1 is a representation of the overall operation of the preferred embodiment of the present invention. First, the density of various portions of a test film is measured by interposing the test film between light emitting diodes (LED), and phototransistors, and comparing the measured voltage output of the phototransistors with preset voltages to derive an output indicative of the density of the test film. The outputs are then operated upon logically to produce status indications relative to the developing process employed to develop the test strip.

An area of the test film which has been exposed with a test pattern and developed to produce one area of medium density (hereinafter referred to as the Medium Area) is illuminated by LED $I_1$. The output is measured by a detector $PT_1$ and then applied to two voltage comparators, $C_1$ and $C_2$ to generate three different conditions — too light, too dark or acceptable. Similarly, an area of the test film which has been "maximally" exposed and developed to produce a dark area is scanned to determine if the density is too light or acceptable. An area of the developed test film upon which no test pattern has been exposed (hereinafter referred to as the Base Fog Area) is scanned to determine if the density is too dark or acceptable.

These seven outputs, and outputs from a clock and multivibrator, are then acted upon logically to activate the various possible LED's labelled as shown in FIG. 1. The possible outputs of the film measuring circuit can be best summarized by the following Truth Table when the output states are defined as follows:

Base Fog Area (B) acceptable — 1; too dark — 0
Dark Area (D) acceptable — 1; too light — 0
Medium Area ($M_L$) acceptable — 1; too light — 0
Medium Area ($M_D$) acceptable — 1; too dark — 0

TABLE 1

| B | D | $M_L$ | $M_D$ | Condition |
|---|---|---|---|---|
| 0 | 0 | 0 | 0 | — |
| 0 | 0 | 0 | 1 | F |
| 0 | 0 | 1 | 0 | E |
| 0 | 0 | 1 | 1 | — |
| 0 | 1 | 0 | 0 | — |
| 0 | 1 | 0 | 1 | — |
| 0 | 1 | 1 | 0 | E |
| 0 | 1 | 1 | 1 | — |
| 1 | 0 | 0 | 0 | — |
| 1 | 0 | 0 | 1 | C |

TABLE 1-continued

| B | D | $M_L$ | $M_D$ | Condition |
|---|---|---|---|---|
| 1 | 0 | 1 | 0 | — |
| 1 | 0 | 1 | 1 | — |
| 1 | 1 | 0 | 0 | — |
| 1 | 1 | 0 | 1 | B |
| 1 | 1 | 1 | 0 | D |
| 1 | 1 | 1 | 1 | A |

The indicator LED's which are used to indicate the status of the film processor are as follows:

| LED No. | Condition |
|---|---|
| $D_1$ | Acceptable |
| $D_2$ | Developer Underreplenished |
| $D_3$ | Developer Temperature Too Low |
| $D_4$ | Developer Overreplenished |
| $D_5$ | Developer Temperature Too High |
| $D_6$ | Developer Contaminated |

When the conditions, as defined in Table 1, exist, the following LED's are illuminated:

| Condition | Output |
|---|---|
| None of A–E | $D_1$ blinks |
| A | $D_1$ steady |
| B | $D_2$ steady |
| C | $D_2$ blinks, $D_3$ steady |
| D | $D_4$ steady |
| E | $D_4$ blinks; $D_5$ steady; $D_6$ steady |
| F | $D_6$ blinks |

The test film is inserted between three light emitting diodes ($I_1$, $I_2$, $I_3$) and their associated phototransistors ($PT_1$, $PT_2$, $PT_3$). By comparing the output of each phototransistor with preset voltage levels, it is possible to determine whether the density of the test film falls within certain limits. Specifically, when the test film has been inserted into the reading position, and off/on switch $S_1$ is placed in the "on" position, a voltage, the value of which is controlled by the light intensity control section in a manner to be described below, is applied through respective resistors $R_1$, $R_2$, $R_3$ and $R_4$ to light emitting diodes $I_1$, $I_2$, $I_3$, and $I_4$. LED $I_1$ illuminates the Medium Area of the test film. The amount of light which passes through the test film, and impinges upon phototransistor $PT_1$ is a function of the density of the film. The voltage, $V_1$, is thus a function of the density of the Medium Area of the film. $V_1$ can be varied by changing the setting of potentiometer $R_5$ when initially calibrating the system. $V_1$ is applied to one leg of voltage comparator $C_1$. A reference voltage $V_2$, determined by the adjustment of potentiometer $R_6$, is applied to the other leg of voltage comparator $C_1$. When $V_1$ is less than $V_2$, the output of $C_1$ is 5 volts (or high). When $V_1$ is more than $V_2$, the output of $C_2$ is 0 volts (or low).

The output of $C_1$ is continuously applied to latch $L_1$. Latch $L_1$'s output follows its input until a low appears on the timer input line at which time the output is "latched" to the value present on the input line.

$V_1$ is also applied to one leg of voltage comparator $C_2$. A reference voltage $V_3$, determined by the adjustment of potentiometer $R_7$ is applied to the other leg of $C_2$. When $V_1$ is less than $V_3$, the output of $C_2$ is low. The output of $C_2$ is applied to latch $L_2$ which functions similarly to latch $L_4$.

Figure 2A:
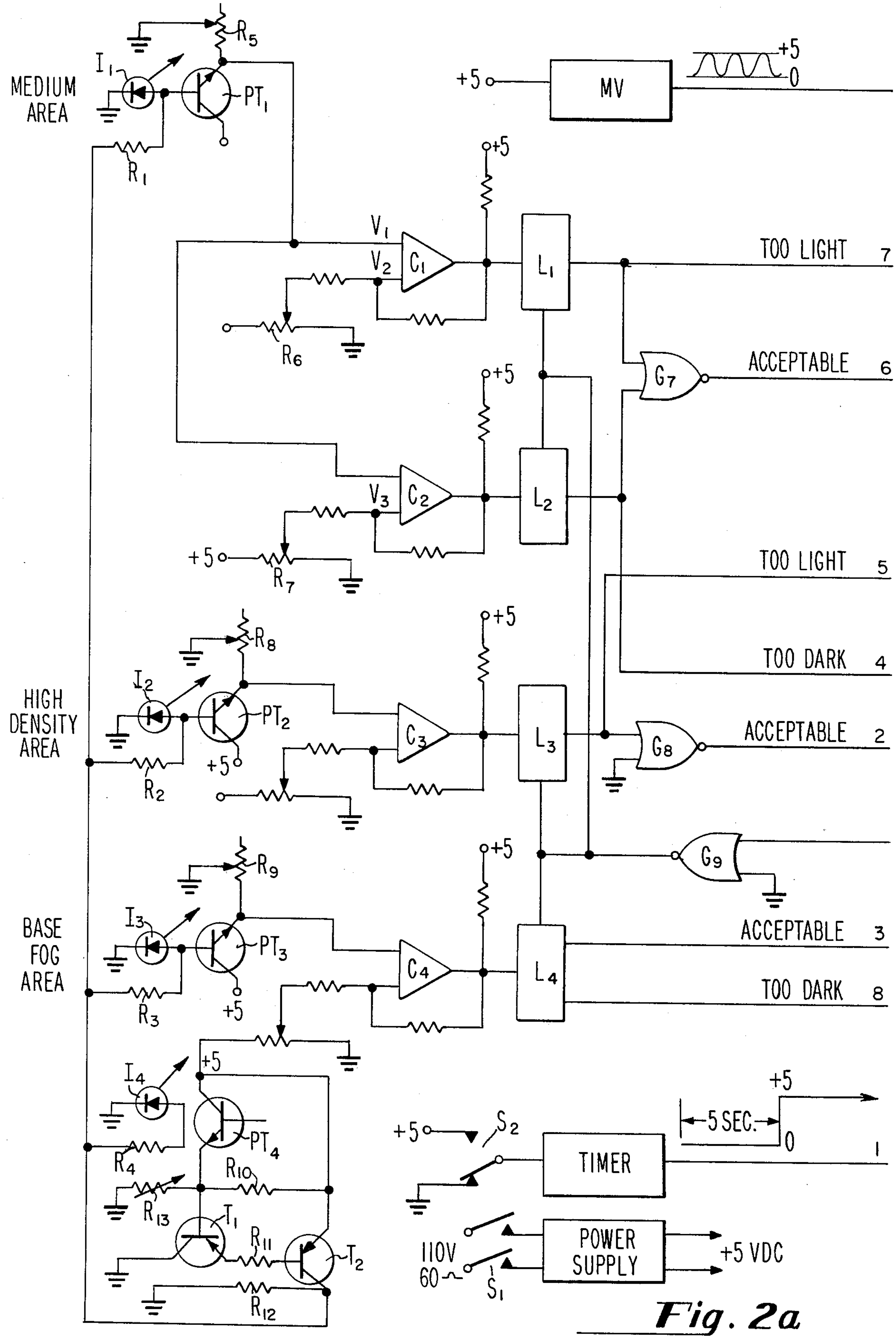
Figure 2B:
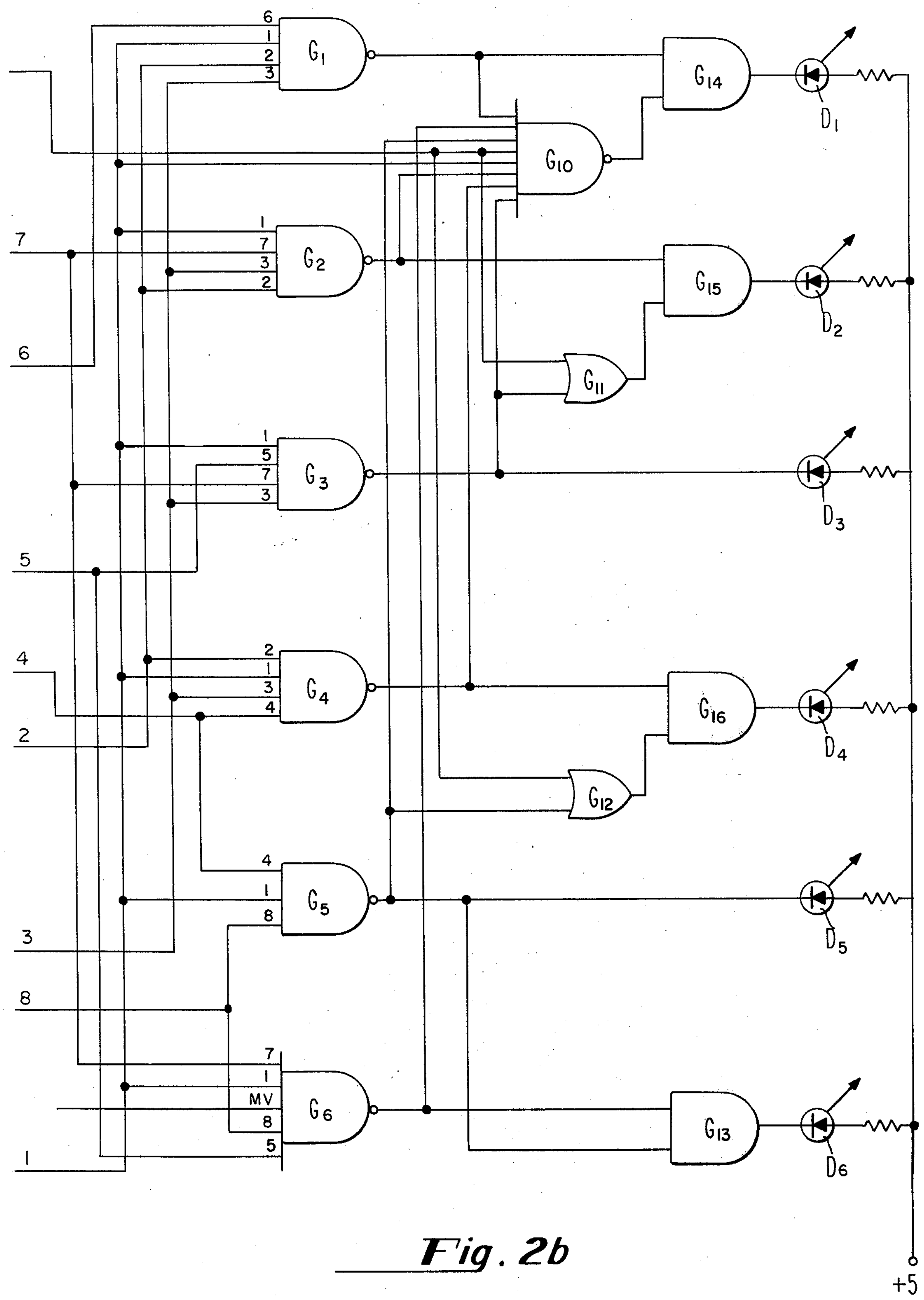

Latch $L_1$ will have a high output if the Medium Area is too light, as indicated in FIG. 2*a*.

Latch $L_2$ will have a high output if the Medium Area is too dark, as indicated in FIG. 2*a*.

The output of NOR gate $G_7$ is high only when both inputs from latches $L_1$ and $L_2$ are low, i.e., when the Medium Area density is neither too high nor too low, as indicated in FIG. 2*a*.

Similar circuits are used to measure the density of the Medium Area and Base Fog Area. The resistance ranges of potentiometers $R_5R_8$ and $R_9$ are different, being chosen with a resistance range appropriate to the density range of the area of the test film being measured.

The output of latch $L_3$ is high when the Dark Area is too light, and low when the Dark Area is acceptable, as indicated in FIG. 2*a*.

Latch $L_4$ has two outputs (normal and inverted) so no inverter is necessary. As indicated in FIG. 2*a*, the outputs relative to the Base Fog Area are either acceptable or too dark.

Before discussing the logic circuitry which operates upon the detector outputs, the Light Intensity Control and Timer will be briefly discussed.

The Light Intensity Control is comprised of LED $I_4$; phototransistor $PT_4$; resistances $R_4$, $R_{10}$, $R_{11}$, $R_{12}$, $R_{13}$ and transistors $T_1$ and $T_2$. The purpose of this circuit is to monitor the output of $I_4$ to hold its light intensity constant. If the light intensity from $I_4$ varies, $PT_4$ in conjunction with power transistor $T_1$ and control transistor $T_2$ varies the voltage to $I_1$, $I_2$, $I_3$, and $I_4$, to stabilize their intensity at a constant level.

The timing circuit consists of a conventional timer activated by microswitch $S_2$ when the film is inserted. Approximately five seconds after the film in inserted (assuming that $S_1$ is in the on position), the output of the timer goes from low to high, as shown in the output waveform sketch in FIG. 2*a*. This output is applied to NAND gates $G_1$ through $G_6$ and, through inverter $G_9$, to latches $L_1$, $L_2$, $L_3$, $L_4$.

This concludes the description of the densitometer section of the invention. Once the device has been turned on, the film inserted, and the 5 second time period has elapsed, the following high inputs to NAND gates $G_1$ through $G_6$ are possible.

| NAND Gate $G_1$ |
|---|
| Middle Area - Acceptable |
| Base Fog Area - Acceptable |
| Dark Area - Acceptable |
| Timer |

When all high inputs are applied to gate $G_1$, a low is applied to AND gate $G_{14}$ then outputs a low, lighting LED $D_1$, indicating "acceptable."

| NAND Gate $G_2$ |
|---|
| Base Fog Area - Acceptable |
| Dark Area - Acceptable |
| Middle Area - Too Light |
| Timer |

When all high inputs are applied to NAND gate $G_2$, a low input is applied to AND gate $G_{15}$, lighting LED $D_2$, indicating "Developer Underreplenished."

| NAND Gate $G_3$ |
|---|
| Base Fog Area - Acceptable |
| Dark Area - Too Light |
| Middle Area - Too Light |
| Timer |

When all high inputs are applied to NAND gate $G_3$, a low output causes LED $D_3$ to illuminate, indicating "Developer Temperature Too Low."

| NAND Gate $G_4$ |
|---|
| Base Fog Area - Acceptable |
| Dark Area - Acceptable |
| Middle Area - Too Dark |
| Timer |

When all high inputs are applied to NAND gate $G_4$, a low input is applied to AND gate $G_{16}$ causing LED $D_4$ to illuminate indicating "Developer Overreplenished."

| NAND Gate $G_5$ |
|---|
| Base Fog Area - Too Dark |
| Middle Area - Too Dark |
| Timer |

When the three inputs applied to NAND gate $G_5$ are high, NAND gate $G_5$ goes low, illuminating LED $D_5$ indicating "Developer Temperature Too High."

| NAND Gate $G_6$ |
|---|
| Multivibrator |
| Timer |
| Middle Area - Too Light |
| Dark Area - Too Light |
| Base Fog Area - Too Dark |

When all of the inputs to NAND gate $G_6$ are high, $G_6$ goes low. This output, applied to AND gate $G_{17}$, illuminated LED $D_6$ indicating "Developer Contaminated." Since one of the inputs to NAND gate $G_6$ is from a conventional multivibrator, MV, shown in FIG. 2*a*, the LED will blink at the frequency of the multivibrator whose output alternates between 0 and 5 volts, as shown.

As described above, NAND gates $G_1$ through $G_6$ have a low output when six possible sets of inputs (covering all possible film conditions of interest) appear. NAND gate $G_{10}$ has as inputs the output lines from each NAND gate $G_1$ through $G_6$ and an input from the timer and multivibrator. When all of these inputs are high, the output of gate $G_{10}$ is low. This low is input to AND gate $G_{14}$, lighting LED $D_1$. Since one of the inputs to $G_{10}$ is the multivibrator, the LED will blink.

The output of NAND gate $G_3$ is applied to the OR gate $G_{11}$, as is the multivibrator output. Accordingly, when gate $G_3$ is low, a pulsing low signal to AND gate $G_{15}$, blinking LED $D_2$.

When NAND gate $G_5$ goes low, a low input is applied to OR gate $G_{12}$, which causes LED $D_1$ to blink. This input is also applied to AND gate $G_{13}$ so that LED $D_6$ burns steadily.

Use of this invention obviously depends upon a test film developed in the processor to be evaluated or controlled. The test film must first be exposed under conditions to produce the so-called "Dark Area," "Medium Area" and the unexposed Base Fog Area. Moreover, the exposure must be calibrated, taking into account the exposure characteristics of the film used so that the density in the three test areas will be within preselected density limits if the film is developed in a processor operating under proper conditions of temperature, developer replenishment and development purity. Representative exposure parameters, in conjunction with equipment and film specifications for producing a test film compatible with the test instruments heretofore described are as follows. Kodak RPL X-ray film, having known developed density to exposure characteristic, is exposed in a preselected Dark Area and Medium Area, respectively, using a density wedge (a strip having a multiplicity of gradations of grey tones ranging from white to black) and a Kodak sensitometer, such that the film, when properly developed has a base fog density in the unexposed area of below 0.23 density units (density units = 1/log transmissivity), a density in the Medium Area of from 1.0 to 1.3 density units and a density in the Dark Area of above 3.4 density units.

In the signalling set up represented by light emitting diodes $D_2$–$D_6$, a blinking signal is used to indicate an irreversible type of processor dysfunction, i.e., a problem which can not be rectified by adjustment of the processor operating conditions but rather requires a complete change, such as complete developer replacement.

While the inventive methods and apparatus have been described with sufficient detail to enable one skilled in the art to practice the teachings contained herein, it is anticipated that many structural variations, as well as electronic circuit equivalents, may be developed by those skilled in the art.

For example, it may be preferable to substitute photo-voltaic cells, with integral temperature compensation circuitry including amplifiers, for the phototransistors $PT_1$, $PT_2$, $PT_3$ and $PT_4$ in order to avoid certain problems which have been encountered due to the temperature sensitive drift of the phototransistors shown in the illustrated embodiment of this invention.

Similarly, the light intensity control circuit, comprised of LED $I_4$ and associated components in the illustrated embodiment may be omitted and a separate photodetector with appropriate feed back circuitry may be associated with the actual light sources $I_1$, $I_2$ and $I_3$, or any one of these (of which the preferred single for this purpose would be the high density area light source $I_2$) to maintain relatively constant output intensity of each of light sources $I_1$, $I_2$ and $I_3$.

Associated elements would of course be included with each such additional photodetector, either to stabilize the intensity of the particular light source sensed or of all of the light souces. The additional photodetector used in such alternative light intensity control would of course be placed to sense light received directly from LED $I_1$, $I_2$ and/or $I_3$ without passing through the film otherwise inserted between the respective LED's and associated photodetectors used in the density sensing function of the apparatus of this invention.

In optimizing the device disclosed and illustrated herein, it is expected that a second timer and latch combination will be included in the circuit to turn off all circuitry after a preselected delay, nominally six seconds, following the output reading indicated by the actuation of one or more of LED's $D_1$, $D_2$, $D_3$, $D_4$, $D_5$ and/or $D_6$. The purpose of this second timer and latch means is to prevent overheating of the circuitry and particularly the light sources and photodetectors in the event the operator neglects to switch the device off.

As will be apparent to those skilled in the art, output signals from gates $G_1$, $G_2$, $G_3$, $G_4$, $G_5$ and $G_6$ may be used directly to control automatically temperature and developer replenishment rate in an associated film processor. Such direct control may be in addition to the logic circuit and output indicators shown in the illustrated embodiment of the invention, or it may obviate the need for such logic circuit and indicators.

In consideration of all of these factors, the appended claims are intended to be interpreted to cover all such variations and modifications which may be made without departing from the true spirit and scope of this invention.

I claim:

1. A method, for determining the status of a photographic film processor including the steps of:

a. exposing a test pattern on the film to produce, upon development at least three test areas comprising a high density area, a medium density area and an unexposed base fog area;

b. developing said film in said processor;

c. measuring the density of said high density area portion of the film to determine if it is too light, or acceptable; measuring the density of the base fog area to determine if it is too dark or acceptable; measuring the density of the medium density area to determine if it is too light, too dark, or acceptable;

d. logically operating upon the results of step (c) by utilizing said results as inputs to digital logic circuitry to produce the output indications indicative of the operational status of the film processor.

2. The method according to claim 1 wherein the measurements of step (c) are made by interposing the test film between a constant light source means and a photodetector means, and comparing the resultant output of the photodetector means with threshold outputs.

3. The method according to claim 2, wherein said constant light source means comprises light emitting diodes and said photodetector means comprises three associated phototransistors.

4. The method according to claim 1 wherein the operational status indications of step (d) consist of one or more of the following:

a. acceptable;

b. developer underreplenished;

c. developer temperature too high;

d. developer overreplenished;

e. developer temperature too low;

f. developer contaminated.

5. An apparatus for determining the status of a processor of photographic film, upon which film a test pattern has been exposed under calibrated conditions to produce, upon development, at least a dark or high density area, an area of middle density, and an unexposed base fog area, comprising;

a. densitometer means to measure the density of the test film in said high density area, said medium density area, and said base fog portion of the film;

b. comparator means to compare the output of the densitometer to threshold outputs for each of the three areas under nominal conditions; and c. digital logic circuit means to operate upon the outputs of said comparator means to produce outputs indicative of the operational status of said film processor.

6. The apparatus according to claim 5 wherein the comparator means comprises:

a. a voltage comparator which compares a voltage output signal of the densitometer measuring the density of the high density area to a threshold voltage to produce different outputs if the high density area of film is acceptable or too light;

b. a voltage comparator which compares a voltage output signal of the densitometer measuring the base fog area of the film to produce different outputs if the base fog area of the film is acceptable or too dark;

c. two voltage comparators which compare voltage output signals of the densitometer measuring the medium density area of the film to produce different outputs if the medium density area of the film is too light, too dark, or acceptable.

7. The apparatus according to claim 6 wherein the digital logic circuit means operate upon the outputs of the voltae comparators to produce diagnostic indications relative to said processor comprising:

a. acceptable;

b. developer underreplenished;

c. developer temperature too high;

d. developer overreplenished;

e. developer temperature too low;

f. developer contaminated.

8. The apparatus according to claim 7 wherein timing and latching circuits are triggered by insertion of the test film into the apparatus, said latches operating upon the outputs of the voltage comparators to povide a stabilized input to said logic circuitry.

9. The apparatus according to claim 7 wherein the output indicators are lights, nomenclatured with said diagnostic conditions.

10. The apparatus according to claim 9 wherein a multivibrator input to the digital logic circuit means is incorporated to provide blinking light indications responsive to specific voltage comparator outputs.

* * * * *